United States Patent [19]
Tomczak et al.

[11] Patent Number: 4,624,029
[45] Date of Patent: Nov. 25, 1986

[54] SHIRRING DEVICE

[75] Inventors: Roman M. Tomczak, Raleigh, N.C.; William W. Babcock, Riverdale; Lee E. Petsche, Burr Ridge, both of Ill.

[73] Assignee: Tipper Tie, Inc., Apex, N.C.

[21] Appl. No.: 787,506

[22] Filed: Oct. 15, 1985

[51] Int. Cl.⁴ .............................................. A22C 13/02
[52] U.S. Cl. ......................................... 17/1 R; 17/42
[58] Field of Search ........................ 17/1 R, 41, 42, 49

[56] References Cited

U.S. PATENT DOCUMENTS

| | | |
|---|---|---|
| 1,059,411 | 4/1913 | Unversaw et al. ............. 17/42 |
| 1,492,697 | 5/1924 | Neuberth . |
| 1,761,189 | 6/1930 | Brennan et al. . |
| 1,993,480 | 3/1935 | Hewitt . |
| 2,498,948 | 2/1950 | Flomen . |
| 2,646,592 | 7/1953 | Kennedy . |
| 2,983,949 | 5/1961 | Matecki . |
| 3,049,749 | 8/1962 | Mayer et al. . |
| 3,097,393 | 7/1963 | Matecki . |
| 3,201,825 | 8/1965 | Riegler . |
| 3,209,398 | 10/1965 | Ziolko . |
| 3,209,399 | 10/1965 | Voigt . |
| 3,222,192 | 12/1965 | Arnold et al. . |
| 3,337,906 | 8/1967 | Kaluza . |
| 3,397,069 | 8/1968 | Urbutis et al. . |
| 3,503,093 | 3/1970 | Marbach et al. . |
| 3,570,046 | 3/1971 | Bender . |
| 3,952,370 | 4/1976 | Greider . |
| 3,964,236 | 6/1976 | Smith . |
| 4,064,673 | 12/1977 | Gerigk . |
| 4,185,358 | 1/1980 | Regner et al. . |
| 4,200,960 | 5/1980 | Kollross . |
| 4,210,981 | 7/1980 | Story . |

Primary Examiner—Willie G. Abercrombie
Attorney, Agent, or Firm—Allegretti, Newitt, Witcoff & McAndrews, Ltd.

[57] ABSTRACT

An improved shirring device for sausage casing includes a fixed station having opposed shirring wheels for shirring casing onto a mandrel. Opposed jaws positioned transverse to the mandrel operate to engage shirred casing and transport it axially along the mandrel to compact the shirred casing.

7 Claims, 5 Drawing Figures

SHIRRING DEVICE

BACKGROUND OF THE INVENTION

This invention relates to apparatus for forming or folding casings particularly sausage casings by shirring the casings on a mandrel or on a tube positioned on a mandrel.

The shirring of casings for meat products such as sausage and for other products is an old and well developed technique in the food processing arts for folding of casings for use in packaging apparatus. Typically a synthetic or natural casing is formed as a long, continuous tube. In order to efficiently and effectively utilize the casing, lengths of it are shirred or folded in pleats transverse to a longitudinal axis of the tube. In this manner, a great deal of casing can be folded and positioned in a sausage or food packing machine, there to be unfolded in a controlled manner according to need.

There are numerous prior art patents which disclose equipment for the shirring of casing. Typical among these patents are a series in the name of Kollross including U.S. Pat. No. 4,377,885 entitled "Shaftless Gear Device for Axial Shirring of Synthetic Tubular Material" issued Mar. 29, 1983; U.S. Pat. No. 4,359,806 entitled "Apparatus for Axial Shirring of Plastic Tubular Material Especially Artificial Casing for Sausage Manufacture" issued Nov. 23, 1982; U.S. Pat. No. 4,354,295 entitled "Device for Axial Shirring of Synthetic Tubular Material for Further Processing Especially on Automatic Sausage Stuffers" issued Oct. 19, 1982; U.S. Pat. No. 4,200,960 entitled "Method and Apparatus for Shirring of Synthetic Tubes, Particularly Casings for Sausage Production" issued May 6, 1980; and U.S. Pat. No. 4,370,780 entitled "Process and Device for Axial Shirring or a Tubular Material Using an Air Stream" issued Feb. 21, 1983.

As the referenced prior art patents disclose, typically rotating wheels are positioned to engage against the outside of casing to fold the casing on a mandrel. The particular arrangement of the wheels, the mechanism for driving the wheels and various other supplemental mechanical equipment are disclosed by the prior art patents. U.S. Pat. No. 4,370,780 discloses an alternative method for shirring casing utilizing an air stream directed obliquely against the casing material in order to effectively pleat or fold the material.

The prior art apparatus for the shirring of casing are useful and effective to provide a high quality shirred casing. However, the apparatus for shirring of casing are extremely expensive and often mechanically complex. Thus, there has remained a need to provide a simple, yet efficient and inexpensive apparatus for the shirring of casing. These are some of the objectives which inspired the development of the present invention.

SUMMARY OF THE INVENTION

In a principal aspect, the present invention comprises a simplified apparatus for shirring of casing material which includes a mounting platform having a pair of opposed shirring wheels mounted on the platform pivotal toward and away from each other in order to engage or disengage from casing material. The apparatus further includes a mandrel aligned with respect to the wheels so that as the wheels engage and shirr casing material, the material is then rucked upon the mandrel or upon a tube supported by the mandrel. The wheels are generally fixed with respect to the longitudinal axis of the mandrel though the wheels are designed to move generally transverse to this axis in order to accommodate various sizes of casing. Adjacent the wheels and positioned over the mandrel are a pair of opposed jaws mounted for movement transverse to the mandrel axis and simultaneously for movement in the longitudinal direction with respect to that axis. The jaws thus are situated to engage the shirred casing and translate that casing axially along the mandrel to compact it as it is being shirred. The jaws reciprocate axially as well as transversely in order to effect this compacting action.

Thus, it is an object of the invention to provide an improved shirring mechanism of sausage casing and the like.

It is a further object of the invention to provide an improved shirring device of simplified mechanical construction which is economical to manufacture and use.

Yet a further object of the invention is to provide an improved shirring apparatus which includes a pair of reciprocal jaws arranged to compact shirred material as opposed generally stationary shirring wheels engage casing and effect shirring of that casing.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Referring to the figures, the apparatus of the invention is supported on a mounting platform 10 which is a tubular steel frame in the form of a rectangular parallelepiped having four vertical corner support posts 12, 13, 14, and 15 connected by four longitudinal, horizontal members 16, 17, 18, 19 and four horizontal, transverse members 20, 21, 22, 23. Within this framework, which constitutes the mounting platform 10, the apparatus of the invention is constructed.

Figure 1:
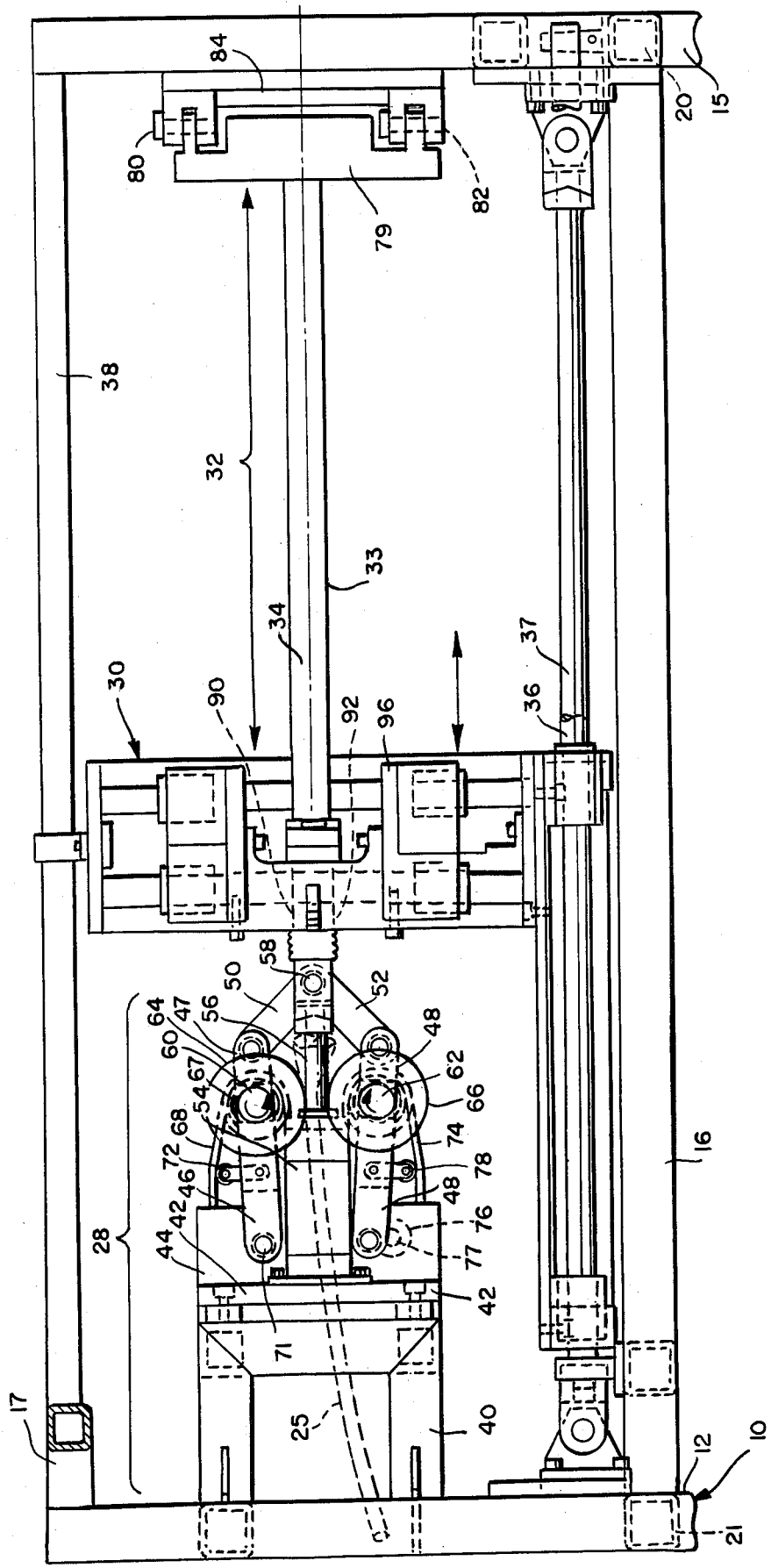
FIG. 1 is a side elevation of the improved apparatus of the invention.
Figure 4:
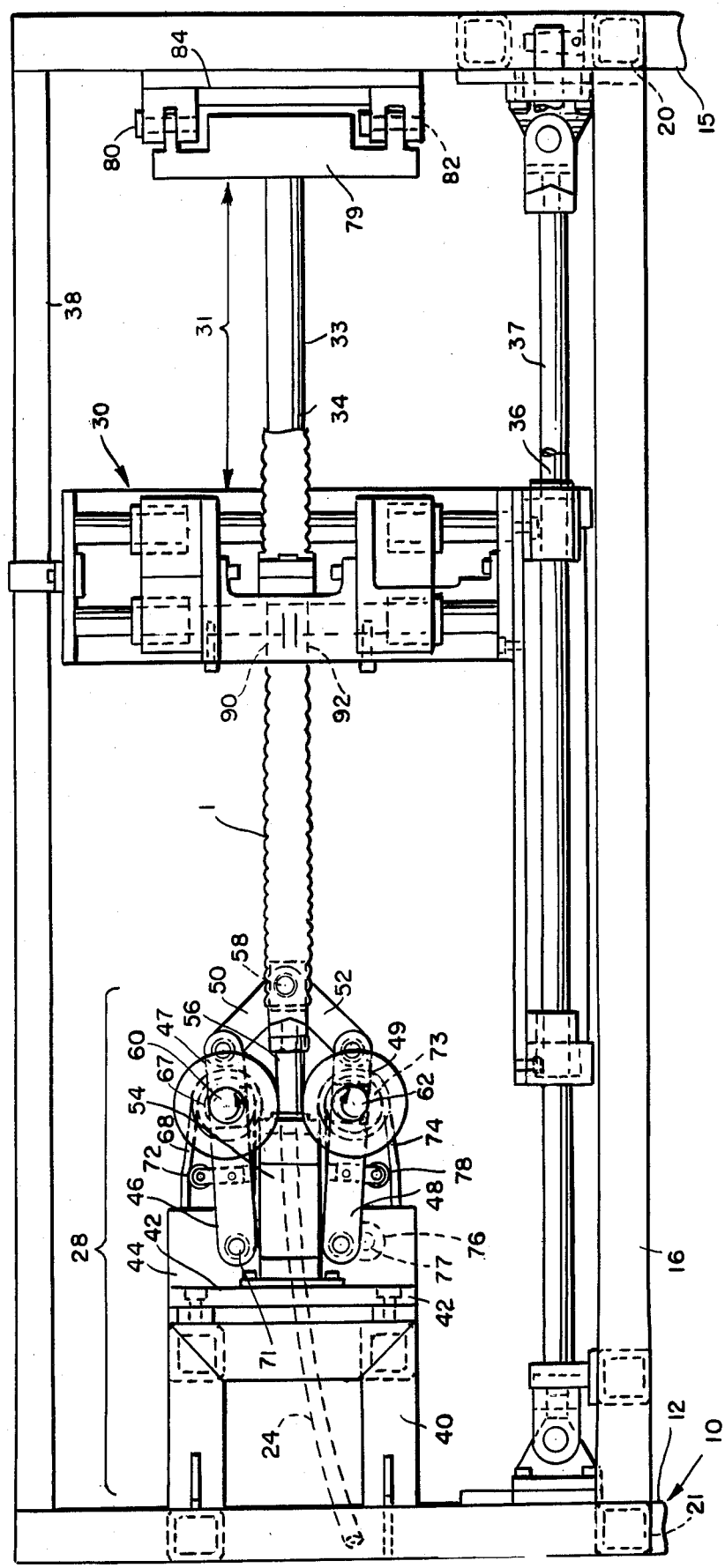
FIG. 4 is a side view similar to FIG. 1 wherein the casing transport assembly has engaged a quantity of shirred casing and is transporting it along the mandrel.
Figure 5:
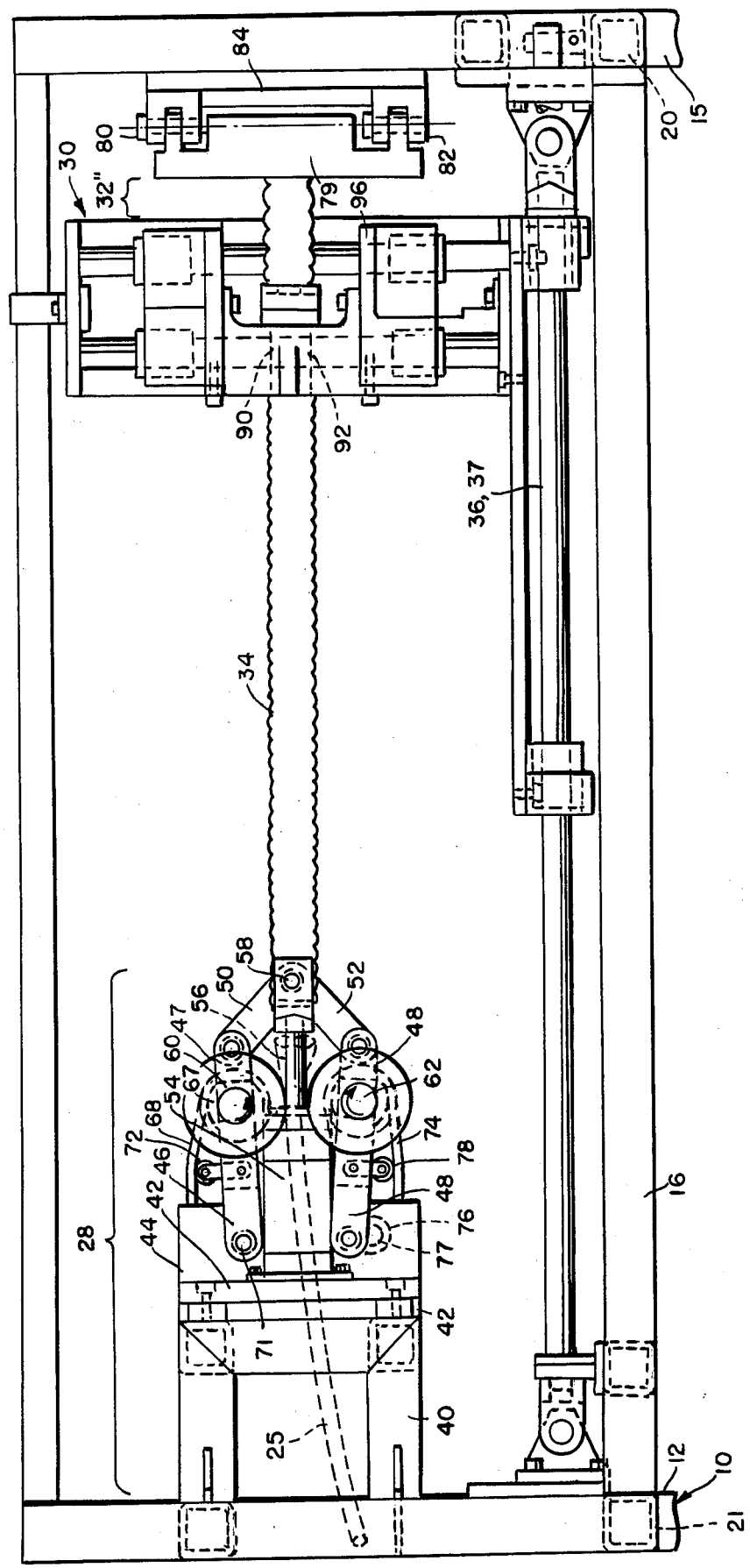
FIG. 5 is a side view similar to FIG. 1 wherein the casing transport assembly is fully retracted and has transported shirred casing a maximum extent axially along the mandrel.

The apparatus includes three interrelated parts or sections; namely, a stationary shirring wheel station 28, a casing transport assembly station 30 and a mandrel assembly 32. The shirring wheel station 28 is stationary and does not move on the frame 10. The shirring wheel station 28, though stationary on the platform 10, includes component parts which are movable as described below. The casing transport assembly 30 is mounted for movement in a longitudinal, axial direction along an axis 34 with respect to the mounting platform 10. It is thus mounted on slide rods 36, 37, and 38. The casing transport assembly 30 also includes a jaw mechanism to be described in greater detail below, which moves transverse to the axis 34. The mandrel assembly 32 includes a mandrel 33 which is pivotally attached to the mounting platform 10 and is pivotal between an axial direction as depicted in FIG. 1 and a pivoted, non-axial position as depicted in FIG. 4.

For purposes of further description, each separate station or assembly will be described and then the interrelationship and overall operation of the apparatus will be set forth.

SHIRRING WHEEL STATION

The station 28 is comprised of a tubular steel bracket 40 attached to platform 10. Bracket 40 supports an air cylinder mounting plate 42 as well as a shirring wheel arm plate 44. Examining first the function and operation of plate 44, plate 44 is positioned adjacent one side of the axis 34 defined by mandrel 33. Attached to the plate 44 is a first arm 46 and a second arm 48. The arms 46 and 48 are pivotally attached to the plate 44. The pivot axis of the arm 46 is above the axis 34 of mandrel 33. The pivot axis of the arm 48 is below the axis 34 defined by the mandrel 33. The arms 46 and 48 may pivot toward and away from one another in the manner to be described below.

The arms 46 and 48 are connected together through the first and second connecting links 50 and 52. The connecting links 50 and 52 connect respectively to the free ends 47, 49 of the arms 46 and 48. Additionally, the links 50 and 52 connect at one end with each other. Thus, as the links 50 and 52 articulate, they control the spacing and pivoting action of the arms 46 and 48.

An air cylinder 54 having a drive rod 56 is mounted on the mounting plate 42. Rod 56 extends parallel to axis 34 and is connected through an appropriate bushing and pivot connection 58 to the pivot connection of links 50 and 52. Extending the rod 56 from the cylinder 54 will cause the links 50 and 52 to articulate equally and thereby cause the arms 46 and 48 to uniformly and equally approach one another. Reversing the movement of the rod 56 will cause the links 50 and 52 to move toward a straight or unarticulated position thereby spreading the free ends 47, 49 of the arms 46 and 48 equally and oppositely.

Adjacent the free end of each arm 46 and 48 is a journaled shaft 60 and 62 respectively. Positioned in alignment with the axis 34 defined by the mandrel 33 is a shirring wheel 64 on shaft 60. In a similar manner a shirring wheel 66 is positioned on the shaft 62.

Each of the shafts 60 and 62 are driven through a pulley. Thus, shaft 60 includes a pulley 67 having a belt 68 over a drive pulley 70. An idler wheel 72 is provided on the arm 46 to control the tension in belt 68.

In a similar fashion, a pulley 73 on shaft 62 is driven by a belt 74 which, in turn, is driven by a drive pulley 76. An idler roller 78 or idler wheel 78 controls the tension in the belt 74.

The drive pulleys 70, 76 may be separately driven or simultaneously driven. Importantly, however, they are driven so that the wheels 64 and 66 will be driven in the opposite rotational sense so as to shirr casing onto a tube or onto the mandrel 33. Thus, the lower wheel 66 will be driven in the clockwise direction whereas the upper wheel 64 will be driven in the counterclockwise direction by the arrangement described. For example, an electric motor 75 can directly drive the shaft 71 for drive pulley 70. The drive shaft 77 associated with pulley 76 can also be driven directly in the same manner or through a gear train between shaft 71 and shaft 77. Importantly, the speed of each wheel 64, 66 should be about equal though it can be varied. In operation, unshirred casing 25 (as shown in phantom in FIG. 1) is fed into the region between the wheels 64 and 66 and over the mandrel 33 which is in the axial position aligned with axis 34. The wheels 64, 66 are made from a material known to be useful for shirring. To cause the wheels 64, 66 to engage casing 25, cylinder 54 is operated to cause the rod 56 to extend thereby bringing the wheels 64 and 66 into contact with the casing 25. As the wheels 64, 66 rotate, they will shirr or ruck the casing onto the mandrel 33. The shirring operation is precisely controlled by control of the air cylinder 54, and the speed of the wheels 64 and 66.

THE MANDREL ASSEMBLY

Figure 2:
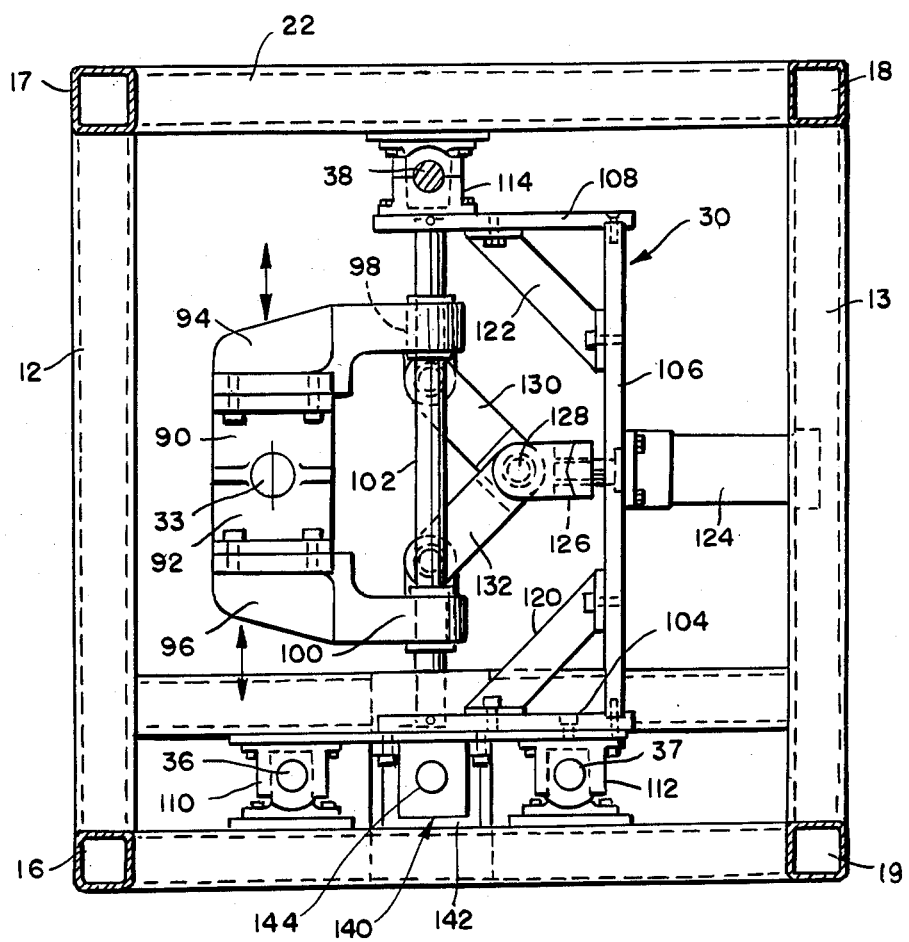
FIG. 2 is a cross sectional view taken along the line 2—2 in FIG. 1 illustrating the jaws which define the casing transport assembly associated with the improved apparatus of the invention.

The mandrel assembly 32 includes the mandrel 33 which is a single extended rod attached to a mounting plate 79 at its pivotal end. Plate 79 is attached by means of hinge pins 80 and 82 to a fixed bracket 84 attached to the platform 10. The pins 80 and 82 permit rotation of the mandrel 33 about the axis 81 defined by the pins 80 and 82. Thus, the mandrel 33 may be pivoted to extend along axis 34 as depicted in FIGS. 1 and 2 between the wheels 64 and 66.

Figure 3:
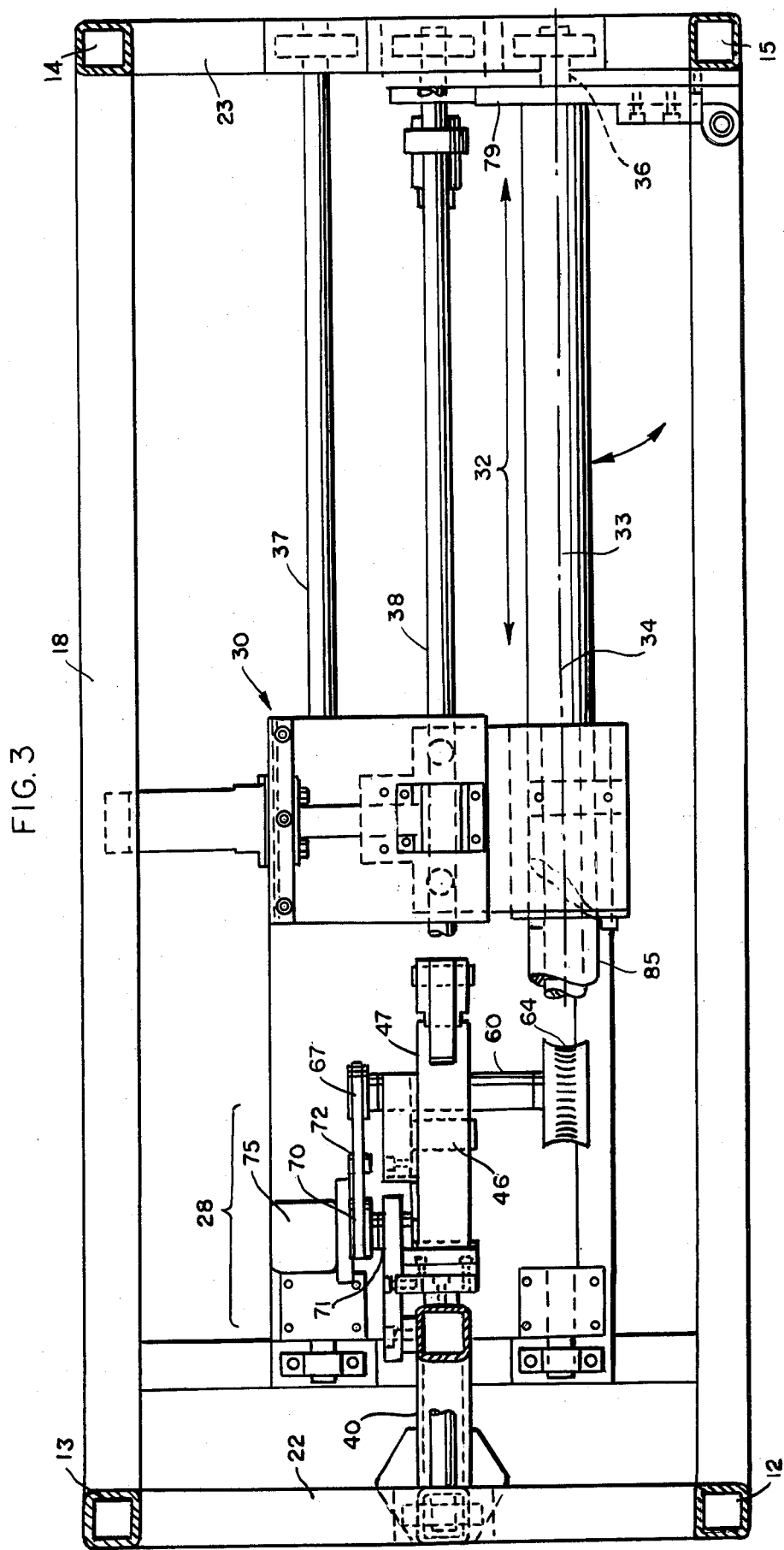
FIG. 3 is a top plan view of the apparatus of FIG. 1 wherein the mandrel is pivoted out of its axial position.

Optionally, a tube 85 in FIG. 3 for carrying shirred casing 25 may be positioned on the mandrel 33 or shirred casing 25 may be positioned on the mandrel 33 itself without the benefit of a tube. In any event, during the shirring operation, the mandrel 33 is aligned axially. After shirred casing is placed on the mandrel 33, the mandrel 33 may be pivoted out of the axial position for removal of the shirred casing 25, for example for use with a sausage machine. The mandrel 33 is then pivoted back into position and the additional casing 25 is shirred thereon.

CASING TRANSPORT ASSEMBLY

Interacting with both the shirring wheel station 28 and the mandrel assembly 32 is a casing transport assembly 30 which moves axially on rods 36, 37, 38 toward and away from the shirring station 28. The casing transport assembly 30 includes first and second opposed jaws 90 and 92 supported respectively by opposed brackets 94 and 96. Jaws 90, 92 include semicylindrical opposed openings designed to fit over the mandrel 33 and cooperatively engage against shirred casing 25. The brackets 94, 96 respectively include a bracket extension 98 and 100, each with a passage journaled on vertical shaft 102. Thus, the brackets 94 and 96 are slidable upon the shaft 102 toward and away from each other to thereby move or transport the jaws 90 and 92 toward and away from each other.

As shown in FIG. 2, the transport assembly 30 also includes on a subframe comprised of a lower plate 104, a vertical frame plate 106 and an upper plate 108. The plates 104 and 108 are slidably mounted respectively on the rods 36, 37, and 38. The plate 104 thus includes first and second slide brackets 110 and 112. The plate 108 includes a single slide bracket 114. Thus, the frame formed by the plates 104, 106 and 108 supports the vertical shaft 102 and is slidable on the rods 36, 37, and 38. Braces 120 and 122 supplement the structural integrity of the described frame.

Attached to the vertical frame plate 106 is a cylinder 124. The cylinder 124 includes a projecting rod 126 which may be extended or retracted. The rod 126 is connected by a pivot link 128 to one end of first and second jaw operating links 130 and 132. The opposite end of the link 130 is pivotally connected to the bracket extension 98. The opposite end of link 132 is attached to the bracket extension 100. The links 130 and 132 articulate with respect to each other and, in turn, as they are articulated, will drive the jaws 92 and 94 together or apart depending upon the amount of articulation. For example, as the rod 126 is extended from the cylinder 124, the links 130 and 132 tend to become less articulated thus separating the jaws 90, 92. Conversely when the rod 126 is withdrawn into the cylinder 124, the links 130 and 132 become articulated thus causing the jaws 92 and 94 to come together in a uniform manner toward the axis 34 defined by the mandrel 33.

As previously described, the assembly mounted on the frame defined by the frame members 104, 106 and 108 is movable axially along the rods 36, 37 and 38. Axial movement is effected by means of air cylinder 140 which translates on rod 144. Other mechanisms maybe used, however, to effect this axial movement. Thus the air cylinder 140 has cylinder rod 144 which extends through both ends, and is affixed to the platform member 104. Cylinder rod 144 is affixed to frame members 22 and 23 so that cylinder can slide on cylinder rod 144 and thereby transport the frame 104, 106 108 in one sense or other other. In this manner the entire frame becomes a transport assembly 30 which is moved axially with respect to the mandrel 33 and with respect to the fixed shirring wheel support station 28.

OPERATION OF THE ASSEMBLY

The shirring of casing 25 is effected by operation of the wheels 64 and 66 as previously described. Shirred casing 25 is directed onto the mandrel 33. Simultaneous with the feed of shirred casing 25 onto the mandrel 33 and periodically the jaws 90 and 92 will move toward one another and engage an amount of shirred casing 25 on the mandrel 33. After the jaws 90, 92 move toward one another and engage the casing 25, the air cylinder 140 is operated in order to transport the entire casing transport assembly 30 to the right as shown in the figures; namely, toward the pivoted end of the mandrel 33. This will, in effect, compact the shirred casing at that end of the mandrel 33. The jaws 90 and 92 will then be separated by operation of the air cylinder 124 in the manner previously decribed. Next the air cylinder 140 is operated to transport the casing transport assembly 30 back toward the shirring station 28. There the jaws 90, 92 again come together by operation of the cylinder 124 and again engage shirred casing 25 and move axially to compress or compact the casing 25 on the mandrel 33. The step of compacting the casing 25 is continued while casing 25 is being shirred by the wheels 64 and 66. In this manner the maximum amount of shirred casing 25 is compacted on the mandrel 33. The operation is continued until tightly packed shirred casing 25 is positioned on the mandrel 33. The casing 25 is then cut, the jaws 90, 92 are separated and the mandrel 33 is pivoted so that the shirred casing 25 can be removed therefrom. The operation is then repeated by positioning the mandrel 33 in its axial alignment position and by again operating the wheels 64 and 66 as well as the jaws 90 and 92 in the manner described.

The controls for the various air cylinders and the motor which drives the shirring wheels 64, 66 are not shown. Such controls are considered to be within the skill of the art and may take various forms. The timing, and speed of operation of the various component parts is somewhat empirical depending, inter alia, upon the casing being shirred.

It is possible to vary the construction of the jaws 90, 92, the mechanism for spreading the jaws 90, 92, and for otherwise transporting the jaws 90, 92 axially. Further, it is possible to vary the construction of the shirring wheel support station 28. For example, it is possible to vary the mechanism by which the shirring wheels 64, 66 are moved relative to each other. Thus, while there has been set forth a preferred embodiment of the invention, it is to be understood that the invention is to be limited only by the following claims and their equivalents.

What is claimed is:

1. Apparatus for shirring of casing comprising, in combination:
   a mounting platform;
   a stationary, shirring wheel, support station on the platform, said station including:
   a support bracket attached to the platform,
   first and second generally parallel, spaced, opposed, support arms, each arm pivotally attached at one end to the bracket, the opposite end of one arm pivotal toward and away from the opposite end of the other arm,
   means for pivoting at least one of the arms toward and away from the other arm,
   said arms extending generally parallel to the direction of movement of casing to be shirred, each of said arms including a shirring wheel rotatably mounted thereon, said wheels being opposed to one another,
   drive means for driving said wheels to shirr casing fed between said wheels as said means for pivoting maintains the wheels in physical contact with casing material fed therebetween;
   a mandrel supported on the platform along an axis generally tangent to the wheels and aligned for receipt of shirred casing from the wheels; and
   a casing transport assembly mounted on the platform for reciprocal movement axially toward and away from the wheels, said assembly including:
   at least one casing jaw member laterally adjacent the axis,
   means for moving the jaw transversely toward the axis to engage shirred casing,
   means to translate the jaw axially to compact the shirred casing on the mandrel as the assembly is translated axially away from the wheels,
   means for releasing the jaw from engagement with shirred casing by movement in a direction transverse to the axis, and
   means to translate the jaw axially for returning the jaw to its original position along the axis.

2. The apparatus of claim 1 including linking means for linking the arms together, and further including means for articulating the linking means to control the spacing of the wheels and contact of the wheels with casing that is being shirred.

3. The apparatus of claim 2 wherein the linking means include at least two connected links connecting the first and second arms and said means for articulating comprises means for varying the angular relationship of the links.

4. The apparatus of claim 1 including first and second opposed jaws on the casing transport assembly.

5. The apparatus of claim 4 including means for controlling the spacing of the jaws.

6. The apparatus of claim 1 including means for pivotally mounting the mandrel for movement between axial alignment and non-axial alignment, said mandrel having a free end adjacent the wheels when the mndrel is in the axially aligned position, and a pivot end, said pivot end attached to the platform.

7. The apparatus of claim 5 including means to move both jaws transversely to the axis.

* * * * *